(12) United States Patent
Cook

(10) Patent No.: US 7,103,163 B1
(45) Date of Patent: Sep. 5, 2006

(54) ENHANCED CALLERID/CALL DELIVERY DEVICE

(75) Inventor: Charles I. Cook, Louisville, CO (US)

(73) Assignee: Qwest Communications International Inc., Denver, CO (US)

( * ) Notice: Subject to any disclaimer, the term of this patent is extended or adjusted under 35 U.S.C. 154(b) by 460 days.

(21) Appl. No.: 10/133,233

(22) Filed: Apr. 25, 2002

(51) Int. Cl.
*H04M 1/56* (2006.01)
*H04M 3/42* (2006.01)

(52) U.S. Cl. .................. 379/142.06; 379/142.07; 379/211.01; 379/211.02

(58) Field of Classification Search ........... 379/142.01, 379/142.06, 142.07, 142.02, 142.04, 142.05, 379/142.12, 142.13, 112.01, 211.01, 211.02
See application file for complete search history.

(56) References Cited

U.S. PATENT DOCUMENTS

| | | | | |
|---|---|---|---|---|
| 5,027,345 A | * | 6/1991 | Littlewood et al. | 370/383 |
| 5,734,706 A | * | 3/1998 | Windsor et al. | 379/142.01 |
| 5,930,700 A | * | 7/1999 | Pepper et al. | 455/435.3 |
| 6,584,188 B1 | * | 6/2003 | Kim | 379/211.02 |

* cited by examiner

*Primary Examiner*—Barry Taylor
(74) *Attorney, Agent, or Firm*—Townsend and Townsend and Crew LLP

(57) ABSTRACT

A method for handling calls for a telephonic device using a call processor is provided. The call processor intercepts a signal for the telephonic device, where the signal includes call information usable by the call processor. The call processor then searches a database for the call information. The database includes one or more actions corresponding to the call information. Once the one or more actions are found, the call processor takes an action based on the corresponding action determined by the search.

24 Claims, 4 Drawing Sheets

ENHANCED CALLERID/CALL DELIVERY DEVICE

BACKGROUND OF THE INVENTION

The present invention generally relates to a call processing device and more specifically to a call processing device for taking actions corresponding to call information received through a telephone network.

As society becomes increasingly mobile, it becomes increasingly difficult to reach a person who is constantly traveling or not near their telephone. Thus, important calls that require immediate responses may be missed. Consequently, a person who is traveling or not near their telephone may want calls to their home or work extension forwarded to where they are presently located. Therefore, any important calls to that individual are not missed.

One method of call forwarding includes using a star code to forward calls from a phone. A user enters a star code using the phone located at the original location and subsequently enters a forwarding number where calls to the original location should be forwarded. Once the code is entered, all calls to the original location will be forwarded to the forwarding number entered. Although calls to the original location are forwarded, the star code does not enable any other intelligent features or any processing of the calls received at the forwarding location.

Other options have become available that users have become increasingly dependent. For example, caller ID has become prevalent in today's phone networks. Caller ID displays the phone number and identity of an incoming phone call. A caller ID box detects caller ID information after a ring voltage is sent to a telephone. The caller ID box then displays the incoming phone number and information associated with that number such as the calling party's name, etc. Caller ID may be helpfull for identifying the person calling; however, the caller ID box does not process caller ID information. It just displays the information for the phone call.

Additionally, if calls are being forwarded to a number, a caller ID box may be used to identify the phone number of the incoming call. However, there is no way to tell who the call is for and if the call is a forwarded call for the original location or for the location where the calls are being forwarded.

BRIEF SUMMARY OF THE INVENTION

In one embodiment of the present invention, a method for handling calls for a telephonic device using a call processor is provided. The call processor intercepts a signal for the telephonic device, where the signal includes call information usable by the call processor. The call processor then searches a database for the call information. The database includes one or more actions corresponding to the call information. Once the one or more actions are found, the call processor takes an action based on the corresponding action determined by the search.

In one embodiment, a method for handling calls for a telephonic device using a call processor is provided. The method comprises: intercepting a signal for the telephonic device at the call processor, wherein the signal includes call information usable by the call processor; searching a database for the call information, wherein the database includes one or more actions corresponding to the call information; and causing the call processor to take an action based on the corresponding action determined by the search.

In another embodiment, a method of forwarding a call for an original location to a call processing device location using a call processing device is provided. The method comprises: connecting the call processing device at the call processing device location; causing the call processing device to connect to a peripheral system, the peripheral system capable of receiving a signal from the call processing device, wherein the signal identifies the call processing device; and configuring the network where calls to the original location are forwarded to the call processing location.

A further understanding of the nature and advantages of the invention herein may be realized by reference of the remaining portions in the specifications and the attached drawings.

DETAILED DESCRIPTION OF THE INVENTION

Figure 1:
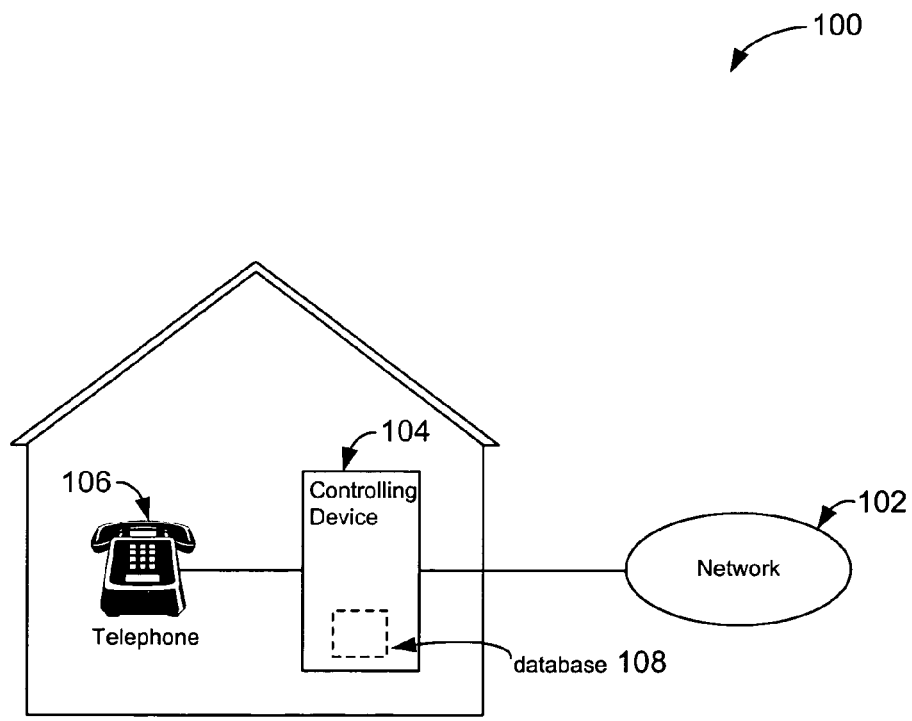
FIG. 1 illustrates a system for call handling according to one embodiment.

FIG. 1 illustrates a system 100 for call handling according to one embodiment. System 100 includes a network 102, a controlling device 104, and a telephone 106.

Network 102 may be any network capable of routing voice and/or data signals. For example, network 102 is a Plain Old Telephone Network (POTS) or Public Switched Telephone Network (PSTN). Additionally, network 102 may be a digital network, such as Internet Protocol (IP) based or any other digital transport based technology, such as Asynchronous Transfer Mode (ATM), frame relay, media pictures expert group (MPEG), SIP, MegaCo, etc. When a POTS or PSTN network is used, DTMF tones are used to communicate with network 102; and when a digital network is used, digital messages or packets are used.

Telephone 106 may be any device capable of receiving communications from network 102. For example, telephone 106 may be a telephone or cell phone. Additionally, telephone 106 may be a personal digital assistant, computer, pocket PC, or the like.

Controlling device 104 receives communications from network 102, processes the communications, and determines an action to take based on those communications. In one embodiment, controlling device 104 includes a database 108. In another embodiment, network 102 includes database 108. Controlling device 104 may also include a screen where communications to a user may be displayed and a message waiting indicator, such as a flashing light.

Controlling device 104 includes software processes that communicate with database 108 upon receiving a call indication from network 102. The processes are able to intercept a call indication, such as ring voltage or appropriate packet indicators in a digital network, and any additional call information received with or after the call indication. The process then communicates with database 108 to determine an appropriate action that should be taken by controlling device 104.

Database 108 is a database that includes a profile for controlling device 104. Database 108 may be programmed by a subscriber through telephone 106, controlling device 104, a computer, and the like. Also, if located in network 102, database 108 may be programmed by interactive voice response (IVR). The profile includes a list of actions that may be taken by controlling device 104. The actions in the list have corresponding entries of call information that are matched with call information received from network 102. Entries of call information may be, for example, telephone numbers, names, etc. When call information from network 102 and the corresponding entries match, the corresponding actions are taken by call processor 104. For example, an action of ringing telephone 106 with a double ring is performed if a certain phone number is received from network 102.

Figure 2:
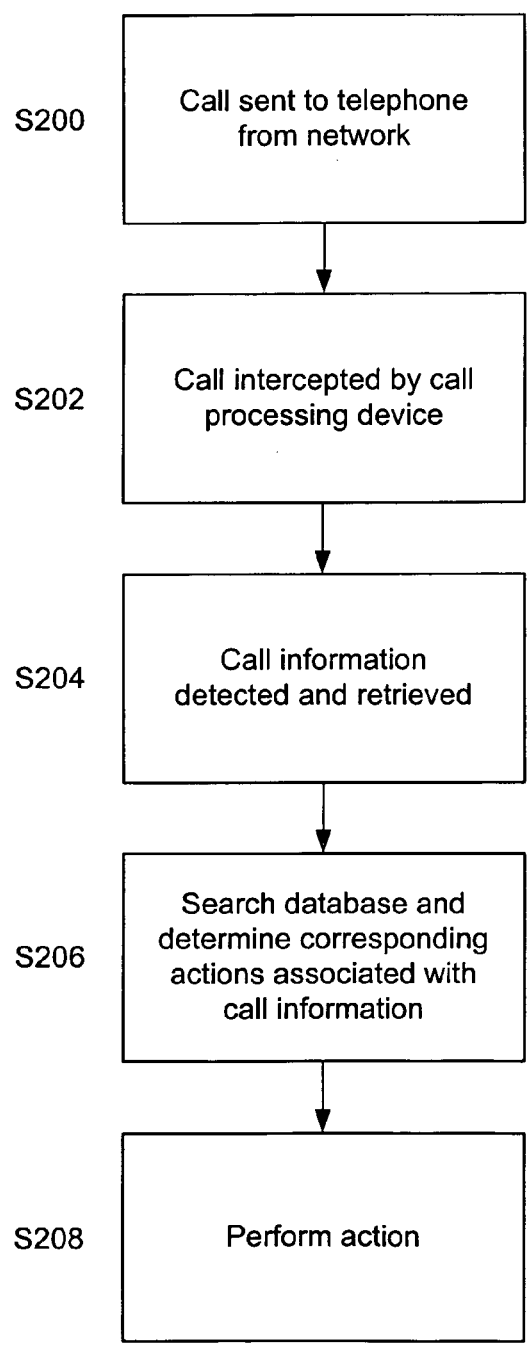
FIG. 2 illustrates a method for handling a call according to one embodiment.

FIG. 2 illustrates a method for handling a call according to one embodiment. In step S200, a call is placed and sent to telephone 106 from network 102. In step S202, call processing device 104 intercepts the signal for telephone 106. The intercepted signal may be ring voltage, a digital packet, or call information.

In step S204, call processing device 104 detects and retrieves call information associated with the signal. The call information is information usable by the call processor. For example, the call information may include caller ID information.

In step S206, call processing device 104 searches database 108 for the call information and determines corresponding actions associated with the call information. In step S208, call processing device 104 performs the action that was determined from database 108.

For example, a phone call is placed through network 102 to telephone 106. Network 102 sends a ringing voltage to telephone 106 that is intercepted by call processing device 104. After the ringing voltage is sent to telephone 106, call information, such as caller ID, is retrieved by call processing device 104. Once receiving the call information, call processing device 104 matches the call information to entries in database 108 and determines corresponding actions to take. For example, if caller ID is not sent or shows up as private, call processing device 104 includes an action to not ring telephone 106. However, if caller ID is provided, call processing device 104 rings telephone 106. Thus, users who do not answer phone calls without caller ID do not have to hear a telephone ring. In another example, database 108 may include call information entries for specific numbers. For example, an action for a specific number may include ringing telephone 106 with a double ring. Thus, if call processing device 104 receives the caller ID corresponding to an action for a double ring, call processing device 104 rings telephone 106 with a double ring. Accordingly, a person may be uniquely identified by the action taken by call processing device 104.

In one embodiment, call processing device 104 may receive call information from network 102 without a call indication. In this case, call information is sent and an action corresponding to the call information is taken. For example, call information is sent and a message based on the call information is displayed on the device. Also, call processing device 104 may be used as a paging or short message indicator where a page or a short message is displayed. Additionally, the call information may be an advertisement or e-mail header.

In another embodiment, call processing device 104 may be used as a voicemail box. In this example, a call signal is sent to call processing device 104 and subsequent call information corresponds to an action for call processing device 104 to download voicemail from network 102. In response to receiving the call information, call processing device 104 communicates with network 102 and downloads voicemail from network 102. Call processing device 104 may then store the voicemails locally. Once stored, a user may check voicemail using call processing device 104 at a later time. Additionally, email may be downloaded to call processing device 104 from network 102 in the same manner.

In another embodiment, call processing device 104 may include local handling of a call. For example, call information may indicate the call should go directly into voicemail. Additionally, call processing device 104 may forward the call; send the call to another call processing device; respond to the call; produce a distinctive ring; forward the call to voicemail, or cell phone, another number, or pager; play an announcement, such as "this phone does not accept anonymous calls . . . "; combine playing announcements with forwarding; and connect to a local answering machine or other device.

Figure 3:
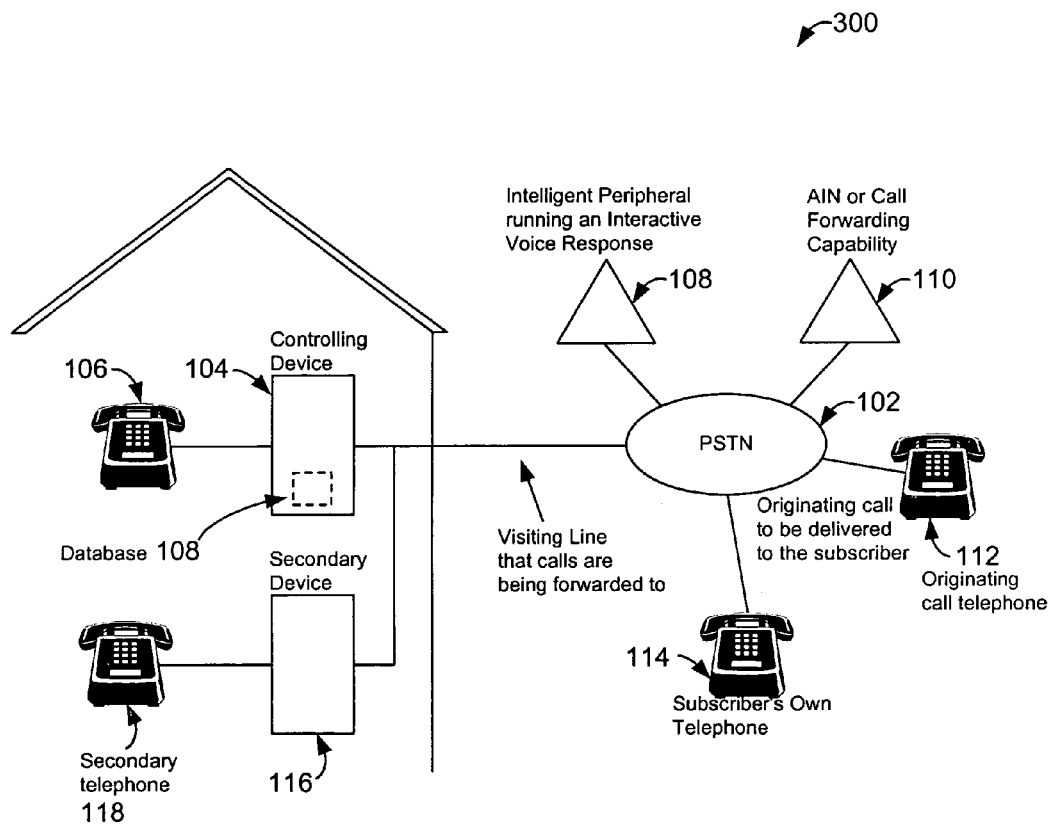
FIG. 3 illustrates another embodiment of a call handling system.

FIG. 3 illustrates another embodiment of a call handling system 300. Call handling system 300 includes network 102, call processing device 104, and telephone 106 of FIG. 1. Additionally, call handling system 300 includes an intelligent peripheral (IP) 108, an Advance Intelligent Network (AIN) trigger 110, an originating call telephone 112, a subscriber's own telephone 114, a secondary call processing device 116, and a secondary telephone 118.

Originating call telephone 112 is a device where an originating call to be delivered to the subscriber's own telephone 114 originated. The call travels through network 102 and is normally routed to subscriber's own telephone 114.

Secondary device 116 and secondary telephone 118 are similar to call processing device 104 and telephone 106, respectively, and provide a chain of call processors, described hereinafter.

Intelligent peripheral 108 is a peripheral connected to network 102 that receives communications from a call processing device. In one embodiment, intelligent peripheral 108 includes an interactive voice response system (IVR). Intelligent peripheral 108 is configured to receive communications from call processing device 104 and take actions based on information sent by call processing device 104. For example, the IVR system receives DTMF tones from call processing device 104 that indicate a certain action should be taken by intelligent peripheral 108. In one example, intelligent peripheral 108 may configure network 102 to forward calls that are intended for subscriber's own telephone 114 to telephone 106, the telephone connected to call processing device 104. Intelligent peripheral 108 may also include logic to verify the identity of or authenticate call processing device 104.

AIN 110 includes logic to receive communication for call processing device 104 and to configure call forwarding to the location of call processing device 104. For example, a call termination trigger is placed on the telephone line for subscriber's own telephone 114. When originating call telephone 112 calls, subscriber's own telephone 114, a switch in the PSTN 102, which has AIN functionality, queries IP 108 for instructions on whether to route the call to subscriber's own telephone 114 or some other destination. If the subscriber has traveled to a remote location, has attached controlling device 104 to the visiting line, and registered with IP 108, then IP 108 will instruct the switch to route the call to the visiting line.

Call processing device 104 includes logic to auto-register with network 102 and intelligent peripheral 108. When call processing device 104 is connected in between telephone 106 and network 102 or to a telephone port of a visiting line, call processing device 104 automatically connects to intelligent peripheral 108. The connection may be made by causing call processing device 104 to automatically dial a number and send a signals to intelligent peripheral 108. Additionally, a trigger may be included along with call processing device 104 to initiate the communication instead of an automatic triggering. The signals sent to intelligent peripheral 108 include information so 1P 108 may identify the subscriber and forward calls from subscriber's own telephone 114 to telephone 106 where call processing device 104 is located.

In one example, call processing device 104 may dial a preprogrammed toll-free number that connects the device to intelligent peripheral 108. Controlling device 104 may submit through DTMF tones or digital messages registration and authentication information from the subscriber, such as a pass code, credit card, telecommunications account number, etc. Intelligent peripheral 108 decodes the information, authorizes, and/or registers the subscriber. Once this is completed, intelligent peripheral 108 configures network 102 to forward the subscriber's calls to the line where device 104 is connected. Additionally, a call information feature is enabled so that call information is sent to call processing device 104 with a phone call. When a call is forwarded, call information may include the forwarding number and the original originating call telephone number. Call processing device 104 then takes a corresponding action according to the call information.

Figure 4:
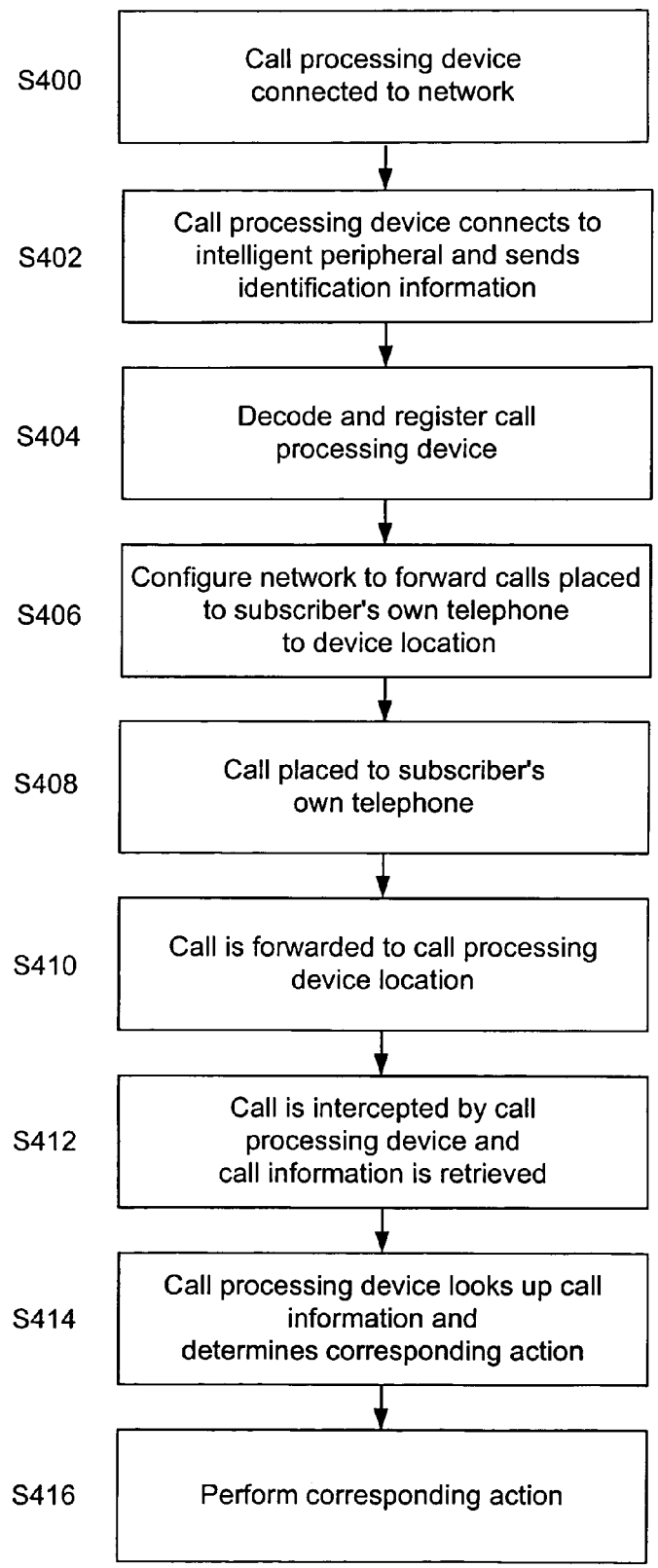
FIG. 4 illustrates a method for call forwarding according to one embodiment.

In FIG. 4, a method for call forwarding according to one embodiment is provided. In step S400, call processing device 104 is connected to a telephone port between telephone 106 and network 102. In step S402, call processing device 104 automatically connects to intelligent peripheral 108 and sends identification and/or registration information. Intelligent peripheral 108 then decodes the information, authorizes, and registers call processing device 104 (step S404).

In step S406, intelligent peripheral 108 configures network 102 to forward calls that are placed to subscriber's own telephone 114 to the device location. Thus, calls placed to subscriber's own telephone 114 are forwarded to the location of telephone 106.

In step S408, a call is placed to subscriber's own telephone 114. For example, originating call telephone 112 places a call to subscriber's own telephone 114. In step S410, the call is forwarded to call processing device 104 because network 102 is configured to forward the calls to subscriber's own telephone 114 to telephone 106.

In step S412, call processing device 104 intercepts the forwarded call. In one embodiment, a call signal is sent that is intercepted by controlling device 104 and then call information is received during or after the call signal.

In step S414, call processing device 104 looks up the call information in database 108 and determines a corresponding action to take with the call information. In step S416, call processing device 104 takes the corresponding action.

In one example, a call from originating call telephone 112 to subscriber's own telephone 114 is forwarded to call processing device 104. The call signal is intercepted by call processing device 104 and call information indicating the phone number of originating call telephone 112 and the phone number of subscriber's own telephone 114 is retrieved by call processing device 104. Using the number of subscriber's own telephone 114, call processing device 104 determines that the incoming call is a forwarded call that is meant for the subscriber. Thus, an action may be taken by call processing device 104 to indicate that the call is for the subscriber and not the individual that usually receives calls on telephone 106. For example, call processing device 104 sends a command to telephone 106 for a distinctive ring or other indication that identifies a forwarded call. Additionally, the number of originating call telephone 112 may be included in the call information and call processing device 104 may take an action for that number also.

Accordingly, an automatic process for call forwarding is provided by call processing device 104. Once call processing device 104 is connected to network 102, call processing device 104 may initiate call forwarding to the location where the device is connected from the subscriber's own phone number. Additionally, a database and corresponding actions are provided that may be used by call processing device 104. For example, users can determine whether calls are for the subscriber or for telephone 106 using call processing device 104.

In another embodiment, call information may indicate that the call is for another phone number and call processing device 104 should take an action to forward the call to that phone number. For example, call processing device 104 may utilize AIN triggers to process the call. A mid-call trigger may be used to send a message to intelligent peripheral 108 to handle the call differently and send the calls directly to voice mail. The mid-call trigger is a trigger activated during a call, such as a flash-hook. For example, if a flash-hook is triggered to establish a 3-way conference call, a switch queries IP 108 for instructions. After receiving the instructions, IP 108 instructs the switch to set up a 3-way call using the digits dialed immediately following the flash-hook. Also, a terminating trigger may be used. The terminating trigger is a trigger set on the line of the person being called. When a call comes in for this person, a switch queries IP 108 for instructions. If this person configured IP 108 to forward all incoming calls to a cell phone, IP 108 instructs the switch to dial the cell phone to complete the call. Additionally, other types and combinations of triggers or trigger-like functionality's may be used to process calls and program IP 108.

Call processing device 104 may forward a call by using a three-way call feature. Call processing device 104 calls the number of a third party that the call should be forwarded to and then bridges the original party to the third party call. In effect, the call processing device 104 has forwarded the call.

In another embodiment, call processing devices may be chained together. For example, call processing device 104 may take an action that transfers the call to a secondary call processing device 116. Secondary call processing device 116 then uses the call information to take an action found in a database on secondary call processing device 116. For example, second telephone 118 may be rung using secondary call processing device 116.

Also, chaining controlling devices may be used to assign calls to a first user to ring telephone 106, but not telephone 118 and calls to a second user would cause telephone 118 to ring but not telephone 106.

In yet another embodiment, multiple phones may be connected to call processing device 104. One phone of the multiple phones is then designated for the subscriber of call processing device 104 and the other phones are for the location where call processing device 104 is located. Call processing device 104 may then be configured to ring the subscribers phone when the call is for the subscriber. Additionally, call processing device 104 may be configured to require the use of a calling card or other means to bill the subscriber's phone separately from the other phones.

An intelligent call processing device is provided by embodiments of the present invention. Call processing device 104 is able to receive call information and process a call according to actions corresponding to the call information. Thus, intelligence is added to a telephone network. Additionally, call processing device 104 enables automatic triggering of call forwarding to a location where the device is connected. Forwarded calls are received and actions may be taken by call processing device 104 according to call information sent with the forwarded call.

The above description is illustrative but not restrictive. Many variations of the invention will become apparent to those skilled in the art upon review of this disclosure. The scope of the invention should, therefore, be determined not with reference to the above description, but instead should be determined with reference to the appended claims along with their full scope or equivalents.

What is claimed is:

1. A method for handling calls for a telephonic device using a call processor, the method comprising:
   detecting a connection of the call processor between a telephone port of a location and the telephonic device such that the call processing device can intercept signals destined to the telephonic device, wherein the call processor is physically located in the location of the telephonic device and is separate from the telephonic device;
   upon being connected to the telephonic device, automatically connecting to a peripheral system to configure a network to send calls to the telephonic device connected to the call processing device, wherein the peripheral system and network are located outside of the location of the telephonic device;
   intercepting a signal destined for the telephonic device at the call processor, wherein the signal includes call information usable by the call processor;
   searching a database for the call information, wherein the database includes one or more actions corresponding to the call information; and
   causing the call processor to take an action based on the corresponding action determined by the search.

2. The method of claim 1, wherein the signal comprises ring voltage.

3. The method of claim 1, wherein the signal comprises a digital packet.

4. The method of claim 1, wherein the call information comprises caller ID information.

5. The method of claim 1, wherein causing the call processor to take the action comprises sending the signal to the telephonic device.

6. The method of claim 1, wherein causing the call processor to take the action comprises sending the signal with an indication to produce a distinctive ring.

7. The method of claim 1, wherein causing the call processor to take the action comprises blocking the signal.

8. The method of claim 1, wherein causing the call processor to take the action comprises forwarding the signal to a second telephonic device.

9. The method of claim 1, wherein causing the call processor to take the action comprises downloading at least one of voicemail, email, and digital messages to the call processor.

10. The method of claim 1, wherein causing the call processor to take the action comprises programming the database.

11. The method of claim 1, further comprising upon being connected to the telephonic device, communicating with the peripheral system to determine the action to take.

12. The method of claim 11, wherein the database is located at the peripheral system.

13. A system for handling calls for a telephonic device, the system comprising:
   a call processor including logic to intercept a signal destined for the telephonic device, wherein the signal includes call information usable by the call processor; and
   a database comprising one or more actions corresponding to one or more call information entries,
   wherein the call processor comprises logic to search the database for the call information and take an action based on the corresponding action determined by the search,
   wherein the call processor is configured to detect a connection of the call processor between a telephone port of a location and the telephonic device such that the call processing device can intercept signals destined to the telephonic device, wherein the call processor is physically located in the location of the telephonic device and is separate from the telephonic device;
   wherein upon being connected to the telephonic device, the call processing device is configured to automatically connect to a peripheral system to configure a network to send calls to the telephonic device connected to the call processing device, wherein the peripheral system and network are located outside of the location of the telephonic device.

14. The system of claim 13, wherein the call processor includes the database.

15. The system of claim 13, wherein the call information comprises caller ID information.

16. The system of claim 13, wherein the action comprises blocking the signal for the telephonic device.

17. The system of claim 13, wherein the action comprises downloading at least one of voicemail, email, and digital messages to the call processor.

18. The method of claim 13, wherein causing the call processor to take the action comprises programming the database.

19. The system of claim 13, wherein the call processing device is configured to be connected to the telephonic device such that the call processing device can intercept signals addressed to the telephonic device.

20. The system of claim 19, wherein the call processor, upon being connected to the telephonic device, is configured to communicate with the peripheral system to determine the action to take.

21. The system of claim 20, wherein the database is located at the peripheral system.

22. A method for handling calls using a call processor, the call processor configured to be compatible with a plurality of telephonic devices, the method comprising:
   detecting a connection of the call processor between a telephone port of a location and a telephonic device in the plurality of telephonic devices, wherein the call processor is separate from the telephonic device and the call processor is configured to be compatible with any of the plurality of telephonic devices, wherein the call processor is physically located in the location of the telephonic device and is separate from the telephonic device;
   upon being connected to the telephonic device, automatically connecting to a peripheral system to configure a network to send calls to the telephonic device connected to the call processing device, wherein the peripheral system and network are located outside of the location of the telephonic device;

intercepting a signal destined for the telephonic device at the call processor, wherein the signal includes call information usable by the call processor;

searching a database for the call information, wherein the database includes one or more actions corresponding to the call information; and causing the call processor to take an action based on the corresponding action determined by the search.

23. The method of claim 22, further comprising upon being connected to the telephonic device, communicating with the peripheral system to determine the action to take.

24. The method of claim 23, wherein the database is located at the peripheral system.

* * * * *